June 23, 1931.  J. W. GREIG  1,811,790
AUTOMOBILE WINDOW OPERATOR
Filed Jan. 10, 1928
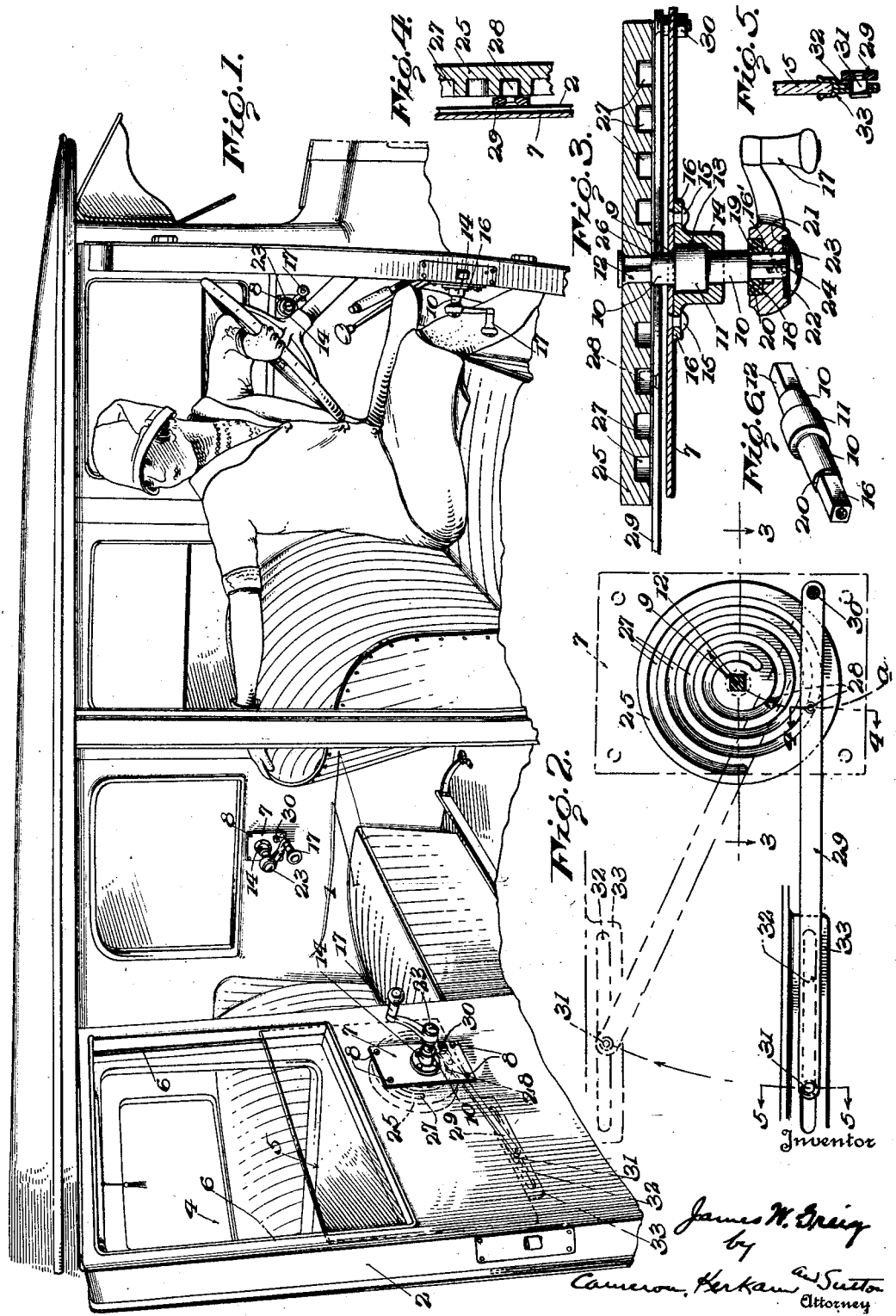

Patented June 23, 1931

1,811,790

UNITED STATES PATENT OFFICE

JAMES W. GREIG, OF GROSSE POINTE, MICHIGAN

AUTOMOBILE WINDOW OPERATOR

Application filed January 10, 1928. Serial No. 245,754.

This invention relates to closure operators and while capable of general use is particularly adapted for opening and closing the windows of automobiles, railway coaches and other vehicles.

One object of the invention is to provide a closure operator that is noiseless or rattleproof and has the parts thereof arranged so as to prevent back lash.

Another object of the invention is to provide a closure operator that is self-locking and does not require a clutch to retain the closure in fixed position or a separate stop to limit its downward movement.

Another object of the invention is to provide a closure operator having a roller so engaged with a cam that the roller is always on dead center and locks the closure operator in any position to which it is moved by the cam.

Another object of the invention is to provide a closure operator having relatively few parts that can be quickly assembled and cheaply manufactured.

Another object of the invention is to provide a closure operator having the parts compactly arranged so as to occupy a minimum amount of space when installed.

Other objects of the invention will appear as the description thereof proceeds.

In order to more clearly understand the invention reference may be had to the accompanying drawings which illustrate the inventive idea and wherein, Fig. 1 is a detail perspective view of part of a motor vehicle, showing the closure operator installed on the vehicle door to open and close the window thereof;

Fig. 2 is a side elevation, partly in section, of the closure operator shown in Fig. 1;

Fig. 3 is a horizontal sectional view on the line 3—3 of Fig. 2;

Figs. 4 and 5 are vertical sectional views on the lines 4—4 and 5—5 respectively, of Fig. 2; and Fig. 6 is a detail perspective view of the stud or shaft for carrying the operating handle and the cam shown in Fig. 3.

Referring to the drawings, wherein like reference characters designate like parts throughout the several views, 1 indicates the body of a motor vehicle having a door 2 hinged thereon in the usual manner. The door 2 is provided at the top thereof with an opening 4 which is normally closed by a window 5 in the form of a glass panel slidably mounted in guides 6, 6, secured in the door at the opposite sides thereof. Mounted in the door below the opening 4, is a plate-like support 7 that is riveted at 8, 8 or otherwise suitably secured to a part of the door frame. This plate or support 7 is provided with an opening 9, and journaled on the plate in said opening is a stud 10 that projects through the opening 9 from both sides of said plate.

The stud 10 is provided with an enlarged annular abutment 11 which, when a reduced, squared end 12 of said stud is passed from the outer side of plate 7 through the opening 9, bears loosely against the said side of the plate. This abutment 11 is received in a socket 13 of a keeper 14 which prevents displacement of the stud 10 and is secured to the outer side of plate 7, as by rivets 15, 15 that pass through suitable, alined openings in said plate and a flange 16 of said keeper. The end of the stud opposite that indicated at 12 projects through a suitable opening in the keeper 14 and is provided with a reduced, squared portion 16′ on which is fitted an operating handle 17 provided at one side with a recess 18 in which is seated a washer 19 of rubber or other suitable material that bears against a shoulder 20 formed at the junction of the squared portion 16′ with the stud 10 proper. The opposite side of the handle 17 is provided with a recess 21 in which is seated a spring washer 22 interposed between the bottom of said recess and the head 23 of a screw 24 that is threaded in the end of the squared portion 16' and serves to prevent displacement of the handle 17 therefrom.

Fitted on the reduced, squared end 12 of the stud 10 is a spirally grooved cam 25 that bears against a shoulder 26 formed at the junction of said end with the stud 10 proper. As herein shown, the spirally grooved cam 25 is formed of a circular solid metal plate or disk, in one side of which the spiral groove 27 is cut, but said groove may be stamped in a sheet metal plate, or formed by a spring, or provided in any desired manner.

The cam 25 is retained on the squared, stud portion 12 preferably by riveting the end of the latter, and the spiral groove 27 of said cam is faced toward the platelike support 7 and receives a roller 28 journaled on a closure operating lever 29 near one end of the same. The end of the lever 29 nearest the roller 28 is pivoted, as by a bolt 30, on the plate 7 at the inner side thereof. In order to provide a compact arrangement of parts that occupy a minimum amount of space, the lever 29 is preferably arranged to extend between the plate 7 and the cam 25, and the latter is mounted on the stud portion 12 in close proximity to the platelike support 7. For this purpose, the shoulder 26 is spaced from the inner face of the plate 7 a distance sufficient to provide clearance for the lever 29 between said plate and the cam 25.

The free end of lever 29 is slidably engaged with the window 5 to raise and lower the same in accordance with the direction of rotation of the cam 25 by the handle 17. For this purpose, the free end of the lever 29 is preferably provided with a pin 31 that projects into a slot 32 formed in a U-shaped channel member 33 secured to the bottom of the sliding window 5.

The roller 28 is preferably mounted on the lever 29 at a point determined by an arc $a$ of a circle struck from the pivot 30 as a center and passing through the center of cam 25 (Fig. 2). It will thus appear that the roller 28 is always maintained on dead center regardless of the position of lever 29, and that the lever 29 and the closure operated thereby, will be locked in any position to which the same may be moved by the cam 25 and cannot be displaced except by turning said cam.

From the foregoing it will appear that when the operating handle 17 is turned in one direction the cam 25 likewise turns in the same direction and through engagement of the roller 28 in the spiral cam groove 27, said cam raises the lever 29 so that like motion is imparted to the window 5 through the sliding engagement of the lever therewith. When the operating handle 17 is turned in the opposite direction the cam 25 is likewise turned and through engagement of the roller 28 in the spiral groove 27, the lever 29 and the window 5 are lowered. At the completion of either raising or lowering movements of the closure, the latter and the lever 29 are locked in position by the roller 28 which, as before described, is always maintained on dead center. At the limit of lowering movement, the closure and lever are stopped by engagement of roller 28 in the outer end of cam groove 27.

It will also appear that by changing the length of the lever 29, the extent of movement of the closure could be increased or decreased as desired, and that in the case of relatively wide closures, a pair of levers such as indicated at 29 could be employed in crossed relation with their rollers engaged in a pair of cam grooves such as indicated at 27, so as to insure against overbalancing or side tilting of the closure.

While the invention has been herein described and illustrated particularly with reference to its use in connection with the operation of windows or closures, it is to be expressly understood that the invention is not limited to such use and that it can be applied to operate dump wagon bodies or various other devices with which mechanism embodying the invention may be associated.

What is claimed is:

1. In a closure operating device, a support, a solid cam element journaled on the support in closely spaced relation therewith and having a closed side remote from the support and an opposite side provided with a spiral groove formed therein and faced toward the support, a single closure operating lever pivotally mounted on the support and extending between the latter and the solid cam element for direct connection with the closure, roller means journaled on the closure operating lever and engaged in the spiral groove of the solid cam element, the point of engagement of said roller means and groove always lying on an arc struck from the pivot point of said closure operating lever as a center and passing through the center of said cam element whereby said roller means is always maintained on dead center relative to said groove, and means for rotating said solid cam element to thereby swing said lever and move said closure.

2. In a window operating device for automobile doors, a metal plate mounted on the door frame below the window opening therein, a circular solid cam element journaled on the plate in closely spaced relation therewith and having a closed side remote from the plate and an opposite side provided with a spiral groove formed therein and faced toward said plate, said spiral groove having a multiplicity of convolutions, a single window operating lever pivotally mounted on the plate and extending between the latter and the solid circular cam element for direct connection with the window in said opening, a roller journaled on the window operating lever and engaged in the spiral groove of the circular solid cam element, the locations of the pivot point of said window operating lever, the center of said cam element and said roller being such that the latter is always maintained on dead center with respect to said spiral groove, and means for rotating the circular solid cam element to swing the window operating lever and raise or lower said window.

In testimony whereof I have signed this specification.

JAMES W. GREIG.